United States Patent
Fogel et al.

[19]

[11] Patent Number: 6,054,651

[45] Date of Patent: Apr. 25, 2000

[54] FOAMED ELASTOMERS FOR WAFER PROBING APPLICATIONS AND INTERPOSER CONNECTORS

[75] Inventors: Keith Edward Fogel, Mohegan Lake, N.Y.; James Lupton Hedrick, Pleasanton, Calif.; Paul Alfred Lauro, Nanuet, N.Y.; Yun-Hsin Liao, Tarrytown, N.Y.; Da-Yuan Shih, Poughkeepsie, N.Y.

[73] Assignee: International Business Machines Corporation, Armonk, N.Y.

[21] Appl. No.: 08/752,469

[22] Filed: Nov. 19, 1996

Related U.S. Application Data

[60] Provisional application No. 60/020,000, Jun. 21, 1996.

[51] Int. Cl.$^7$ .................................................. H01B 7/00
[52] U.S. Cl. ................................................... 174/110 F
[58] Field of Search ............................... 174/110 F, 110 S

[56] References Cited

U.S. PATENT DOCUMENTS

| | | | |
|---|---|---|---|
| 2,948,020 | 8/1960 | D'Ascoli | 174/110 X |
| 3,576,388 | 4/1971 | Bruns | 174/110 F X |
| 3,985,951 | 10/1976 | Harris | 174/110 F X |
| 4,379,858 | 4/1983 | Suzuki | 174/110 F X |
| 4,423,282 | 12/1983 | Suzuki et al. | 174/110 F X |
| 4,443,657 | 4/1984 | Hill et al. | 174/110 F X |
| 4,450,376 | 5/1984 | Meitzler | 174/110 F X |
| 4,647,716 | 3/1987 | Akiyama et al. | 174/110 F X |
| 5,286,924 | 2/1994 | Loder et al. | 174/110 F X |
| 5,441,690 | 8/1995 | Ayala-Esquilin et al. | 264/277 |
| 5,455,392 | 10/1995 | Preu et al. | 174/110 F X |
| 5,519,172 | 5/1996 | Spencer et al. | 174/110 S X |
| 5,562,985 | 10/1996 | Sano et al. | 174/110 F X |

FOREIGN PATENT DOCUMENTS

| | | | |
|---|---|---|---|
| 582270 | 11/1946 | United Kingdom | 174/110 F X |

*Primary Examiner*—Dean A. Reichard
*Attorney, Agent, or Firm*—Thomas A. Beck

[57] ABSTRACT

The present invention is directed to a new foamed elastomer composition including elastomer, hollow fillers, and reinforced fillers for supporting the conducting wires in the test probes for wafer level testing and burn in and interposer connector applications. The thermally stable elastomer resin is mixed with hollow fillers and reinforced fillers before filling into the probe or connector mold with an array of elongated conducting wires, then is crosslinked by a crosslinking agent and a catalyst. The use of compressible hollow fillers to foam the elastomer has been successful to enhance the compliance and resilience, and to reduce the thermal expansion, density, and dielectric constant of the elastomer.

7 Claims, 6 Drawing Sheets

FOAMED ELASTOMERS FOR WAFER PROBING APPLICATIONS AND INTERPOSER CONNECTORS

This application claims priority from Provisional Application Ser. No. 60/020,000 which was filed Jun. 21, 1996.

FIELD OF THE INVENTION

This present invention is directed to a foamed material, in particular a foamed elastomer useful for electronic devices, and more particularly for the manufacturing of high density test probes for wafer level testing and burn-in (WLTB) and interposer connectors.

BACKGROUND OF THE INVENTION

In the microelectronics industry, before integrated circuit (IC) chips are packaged in an electronic component, testing is essential to ensure that electronic components perform the function for which they were designed. The testing is commonly done both at room temperature and at elevated temperatures to test functionality, and at elevated temperatures with forced voltages and currents to burn the chips in and to test the reliability of the integrated circuit to screen out early failures.

Contemporary high density testing probes for integrated circuits are typically fabricated on a support substrate from groups of elongated conductor beams which fan inwardly towards a central location where each conductor has an end which corresponds to a contact location on the integrated circuit chip to be tested. The conductors are cantilever over an aperture in the support substrate. Because the cantilevered beams are easily displaced and deformed after compressive force in the testing process, the high density testing probes only survive a limited number of test operations.

The present invention provides a probe structure which overcomes the permanent damage or displacement of the conductor beams which occurs in currently available probes when they are repeatedly placed in contact with a device under test. This is achieved by a new probe technology, according to the present invention, using fine wires embedded in the thermally stable elastomer. For the probe technology, according to the present invention, high compliance is achieved at low contact force using an elastomer which has a combination of thermal stability, resilience, good mechanical properties, and processibility.

OBJECTS OF THE INVENTION

It is an object of the present invention to provide an improved probe structure.

It is another object of the present invention to provide an improved probe structure incorporating an elastomer material.

It is another object of the present invention to provide a method of foaming the elastomer.

It is another object of the present invention to provide a method to form an elastomeric structure while controlling the dimensional changes of the foamed structure during foaming.

It is another object of the present invention to provide a method to form a foamed elastomer structure having a uniform foam size and distribution throughout the elastomer structure.

It is another object of the present invention to provide a method to form a foamed elastomeric structure having a planar surface before or after crosslinking in an open cavity.

It is another object of the present invention to provide a method to form a foamed elastomer to lower the coefficient of thermal expansion, density, thermal conductivity and dielectric constant of the elastomer.

It is another object of the present invention to provide a method to form a foamed elastomer to improve the compliance and resilience of the elastomer.

It is another object of present invention to provide a foamed elastomer composition with improved compliance, resilience, and processibility for electrical probe and interposer connector applications.

It is another object of the present invention to provide a foamed elastomer composition with improved mechanical strength by including reinforced fillers.

It is another object of the present invention to provide a low viscosity uncrosslinked foamed elastomer composition to readily fill in and level off within a conducting wire array.

It is another object of the present invention to provide a crosslinking process for foamed elastomers with controlled working time and crosslinking temperature.

It is another object of the present invention to provide a method to fabricate a multilayer foamed elastomeric structure and interposer connector.

SUMMARY OF THE INVENTION

It is a broad object of the present invention to provide a method to foam an elastomer to be used in the electronic device for lowering the weight, thermal conductivity, coefficient of thermal expansion, and dielectric constant of the elastomer and for improving the compliance, resilience, and dimensional stability of the elastomer.

It is another object of the present invention to provide a method of foaming the elastomer in an open mold.

It is another object of the present invention to provide a foamed elastomer having controlled dimensions.

It is another object of the present invention to provide a method to fabricate the new foamed elastomer with improved compliance, resilience, mechanical properties, and processibility for applications in WLTB and interposer connectors.

Table 1 shows the properties of VTS1000 loaded with varied amounts of DE551 microspheres.

Table 2 shows the compliances of as-is and heat treated VTS1000 with varied dosages of DE551 microspheres.

Table 3 shows the compliances of as-is and heat treated VTS1000 with varied dosages of DE091 microspheres and ZnO/CeO.

Further objects, features, and advantages of the present invention will become apparent from a consideration of the following detailed description of the invention when read in conjunction with the drawing FIGs., of which the following is a more detailed description:

DETAILED DESCRIPTION

The present invention relates to the foamed elastomers used in the test probes of wafer level testing and burn in (WLTB) and interposer connector applications. The foam structure is directed to enhance the compliance and resilience of an elastomer supporting the conducting wire array.

The compliance of an elastomer can be improved by forming a foam structure urethane. The foamed structure can be compressed easily and will return to its original shape when the applied force is removed, whereas unfoamed urethanes cannot. For WLTB and interposer connector applications, it is more desired that the foaming of elastomer be processed in an open mold and have a controlled dimension, which is inaccessible by the traditional foaming technique.

The traditional foaming technique which uses a blowing agent such as a chemical or physical blowing agent can not be used to form the structures according to the present invention because the foaming processing for the present invention is preferably done in an open mold and dimensional control is maintained during the foaming process. The present invention provides a new method to form a foamed elastomer structure to improve the compliance and resilience of the elastomer, and to process the elastomer in an open mold with controlled dimension. It was achieved by loading hollow fillers into the elastomers; or loading solid fillers containing a blowing agent. The hollow fillers can be formed from the solid fillers after being treated with energy such as heat and radiation which causes the blowing agent to expand. The hollow fillers or solid fillers are preferably formed from a polymeric material.

The hollow filler is compressible under pressure, and returns to its original shape after the pressure is released. The resilient filler has a compressible shell which can be selected from flexible polymer materials such as polystyrene, polypropylene, polyacrylonitrile, poly(vinylidene chloride), and Urethane, Poly (styrene-acrylonitrile), poly(methyl methacrylate), poly(vinyl alcohol), polyaniline, polyimides, polyamides, polycarbonate, polyethylene and silicon rubber. The diameter of the hollow fillers preferably are less than 200 microns for the testing probe of WLBT and interposer connector applications. The resilient hollow fillers dispersed in an elastomer form a closed-cell foam structure. The compressible shell can be enclosed with gas, liquid, or solid. As such, a variety of applicable polymer materials of compressible shells can be used for the WLTB and interposer connector applications according to the present invention.

The hollow filler can be expanded when the filler is encapsulated with a blowing agent such as isobutane, isopentane, diazoaminobenzene, azobis(isobutyronitrile), dinitroso pentamethylene tetramine, N,N'-dinitroso-N,N'-dimethyl- terephthalamide, azodicarbonamide, benzene sulfonyl hydrazide, toluene sulfonyl hydrazide, and sulfonyl semicarbazides. The expansion of hollow filler can be controlled by temperature, radiation, hardness of polymer shell, blowing agents, hardness of surrounding elastomer, or by the chemical properties of the shell and surrounding material.

To further improve the compressibility of the hollow filler, a thermal treatment is preferably applied. The compressibility of the hollow filler with a thin shell depends on the pressure built inside the shell, especially, when the hollow fillers were formed by a blowing agent which expands and generates a high pressure. A thermal treatment near the glass transition temperature or softening temperature of the shell can reduce or release the enclosed high pressure by forming a leak in the shell or by heat and chemical treatment such as the use of solvents to form the shell. If the structure is heated close to the glass traition temperature a leak can be formed. An example of a solvent which can form a leak is acetone.

Figure 1A:
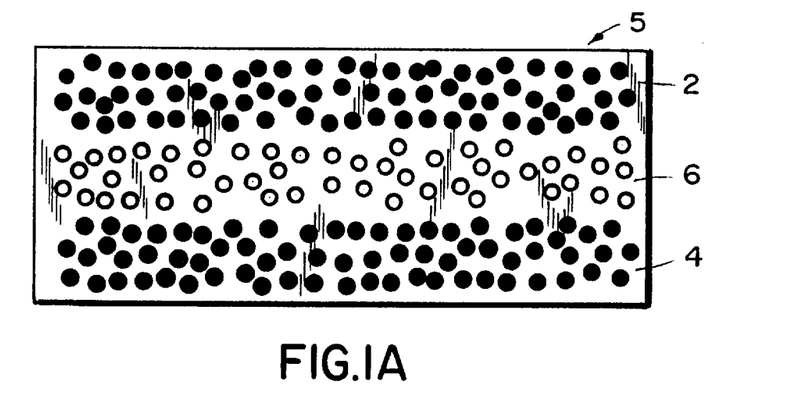
FIGS. 1a, 1b, and 1c show the multilayer structures of elastomer foams for WLTB and interposer connector applications.
Figure 1B:
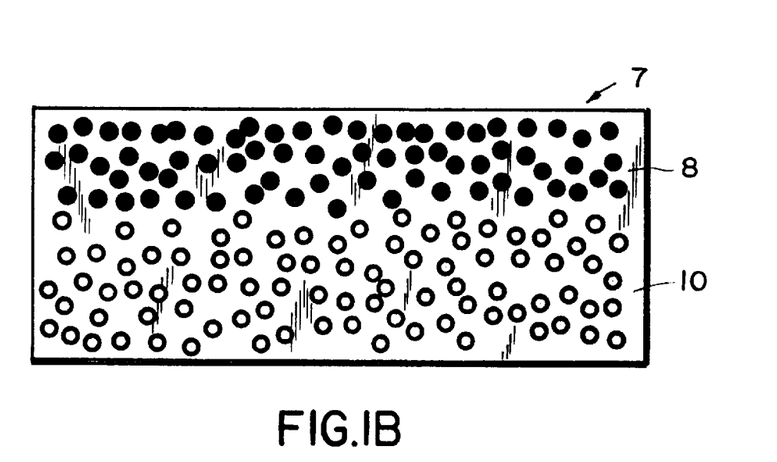
Figure 1C:
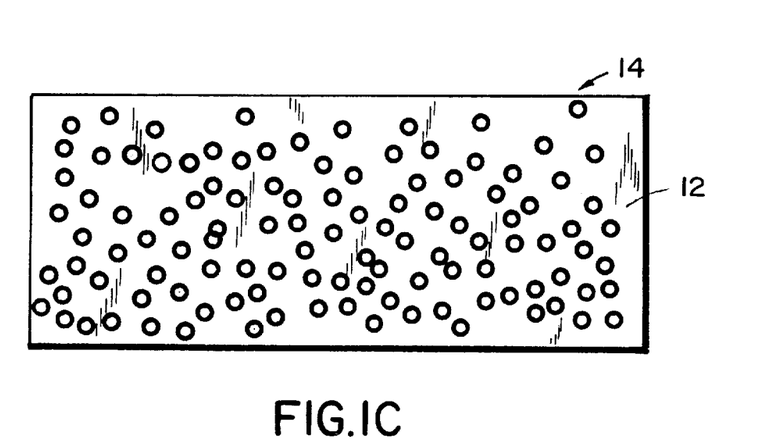

The interaction between hollow filler and elastomer resin will affect the distribution of hollow fillers in the elastomer during crosslinking. A strong interaction can provide a better dispersion of hollow fillers in the elastomer, which is preferable. It can also be achieved by using a chemical adhesion promoter such as a silane coupling agent, and a high viscosity elastomer resin as well. Examples of high viscosity elastomer resins are vinyl terminated polydimethylsiloxane, hydride silanol, amino, epoxy, and carbinol terminated polysiloxane. The preferred embodiment of the elastomeric foam structure is described in FIGS. 1a, 1b, 1c. The hollow fillers with densities less than 0.1 g/cm$^3$; tend to float on the surface of elastomer resin, whereas, the inorganic fillers for reinforcing elastomer such as zinc oxide tend to precipitate down. The range of some suitable fillers that can be used in accordance with the present invention are 5% to 30% by weight zinc oxide and 2% to 10% by weight lanthanide oxide. By taking advantage of these phenomena, the multilayer structure in FIG. 1a can be constructed. FIG. 1a respectively shows an elastomer laminate 5 comprising filler rich layers on the top and bottom layers 2 and 4 respectively that sandwich a hollow filler layer 6. FIG. 1b shows a two layer structure 7 containing a reinforced filler layer 8 disposed adjacent a hollow filler layer 10. FIG. 1c is a single layer structure 14 having hollow fillers 12 distributed uniformly in the elastomeric material.

The hollow fillers, solid fillers, and elastomer resin are mixed before crosslinking in an open mold. The crosslinking is achieved by crosslinking agents such as methylhydrosiloxane-dimethylsiloxane copolymers, oxygen, peroxides, 1,4-poly-1,3-dienes, and sulfur and accelerated by a catalyst such as Platinum carbonyl complex, platinum-divinyltetramethyldisiloxane complex, or platinum-cyclovinylmethylsiloxane complex, or slowed down by a moderator such as methyl-isobutynol, or t-butylhydroperoxide at room temperature or elevated temperature. Due to the fact that a variety of elastomer resins can be loaded with the hollow fillers resulting in the increase of compliance, resilience and the reduction of thermal expansion, density, and dielectric constant by using the methods described in the present invention, all of them are included in the present invention. Examples of elastomers are natural rubber, styrene-butadiene rubbers, polybutadiene rubbers, isobutylene-isoprene rubbers, ethylene-propylene polymers, nitrile butadiene rubbers, polychloroprene neoprene, chlorosulfonated polyethylenes, chlorinated polyethylene, epichlorohydrin elastomers, acrylic elastomers, urethane elastomers, polysulfide elastomers, silicon elastomers, fluorocarbon elastomers, thermoplastic styrenic, urethanes, copolyester ethers, polymer blend thereof, olefins elastomers thereof and combinations thereof.

The following is a detailed description of methods of preparation and examples of certain compositions for the present invention. The detailed preparations fall within the scope of, and serve to exemplify, the more generally described methods of preparation set forth above. The following are presented for illustrative purposes only, and the present invention is not limited thereto.

A thermally stable polysiloxane elastomer was chosen such as disclosed in U.S. Pat. No. 5,441,690, the disclosure of which is incorporated herein by reference, as an example, for the test probe of the wafer level burn in. The polysiloxane is a random copolymer of dimethylsiloxane and diphenylsiloxane and is generally comprising about 70 to 85% by weight of dimethylsiloxane and about 15 to 30% by weight of the diphenylsiloxane. Preferably the copolymer comprises about 20–25% by weight of the diphenylsiloxane which provides the thermal stability to the crosslinked resin without substantially increasing the viscosity of the uncrosslinked resin. Preferred weight average molecular weight of the uncrosslinked copolymer was found to be between 2,500 and 35,000 g/mol.

The polysiloxane resin is crosslinked via hydrosilylation chemistry standard to the industry preferably using a hindered platinum catalyst in a reactive silicon oil. Selection of platinum catalysts can control the preferred temperature of crosslinking. Platinum in vinyldisiloxane was used in room temperature vulcanizing, and platinum in cyclic vinylsiloxane was used in high temperature vulcanizing.

Apart from the temperature of crosslinking, the retarders and inhibitors were used to control the work time of polysiloxane resin. A typical moderator is tetravinyltetramethyl-cyclotetrasiloxane. Acetylenic alcohols such as methyl-isobutynol are volatile inhibitors.

The foaming of polysiloxane resin was done by loading the compressible hollow fillers. Due to the fact that a variety of polymeric hollow fillers are available to use, the microsphere was chosen as an example for illustrative purpose only. The microsphere comprises a polymeric shell encapsulating a blowing agent and the polymeric shell can gradually soften and the blowing agent can star to expand after heat. The expansion can be stared at a temperature range from 75° C. to 195° C. to a mean diameters of 10 to 100$\mu$ and densities of 0.01 g/cm$^3$ to 0.07 g/cm$^3$. Both expanded and unexpanded hollow filler particles can be loaded in polysiloxane resin to meet the requirements. Such microspheres are now commercially available from Expancel Inc. USA.

The hollow fillers can be created by blowing out unexpanded fillers before being loaded into polysiloxane resin as mentioned above, or the unexpanded fillers can be loaded before blowing in the polysiloxane resin. The unexpanded fillers then can be expanded into a hollow filler by heat at a temperature range from 75° C. to 195° C. before or after the crosslinking of polysiloxane resin.

The dosages of unexpanded and expanded microspheres were generally in the range of 0.5 to 5 parts per 100 parts of polysiloxane resin. Preferably the dosage of unexpanded microspheres is 1.5 parts by weight and expanded microspheres is 3 parts by weight per 100 parts by weight of polysiloxane. In addition, the adhesion of the microspheres to resin is significantly enhanced by the use of commercially available adhesion promoters such as a silane coupling agent. The mix of expanded and unexpanded microsphere is to control the volume stability of the finally formed structure. The total microsphere additive is preferably 0% to 20% by weight of the particle elastomer composite, more preferably, 0% to 10%, most preferably 0% to 4%. The unexpanded filler can be from 0% to 100% by weight of the total filler. Where the total filler comprises only expanded and unexpanded filler the amount of expanded and unexpanded filler vary in a reciprocal relationship. The amount of expanded and unexpanded filler and other fillers present are adjusted in the elastomer composite so that after the process to expand the unexpanded filler the physical properties of the composite such as volume do not change significantly. An expanded microsphere when heated further expands and if it ruptures, it leaks and then contracts. An unexpanded microsphere expands. By proper selection of the unexpanded to expanded microsphere contact the expansion of the unexpanded microspheres balances the contraction of the ruptured expanded microspheres.

The reinforced fillers preferably comprise two metallic oxides consisting of zinc oxide and a second oxide selected from an oxide of an element in the lanthanide series, such as lanthanide oxide, preferably ceric dioxide, neodymium oxide, samarium oxide or europium oxide or mixtures thereof.

Figure 2:
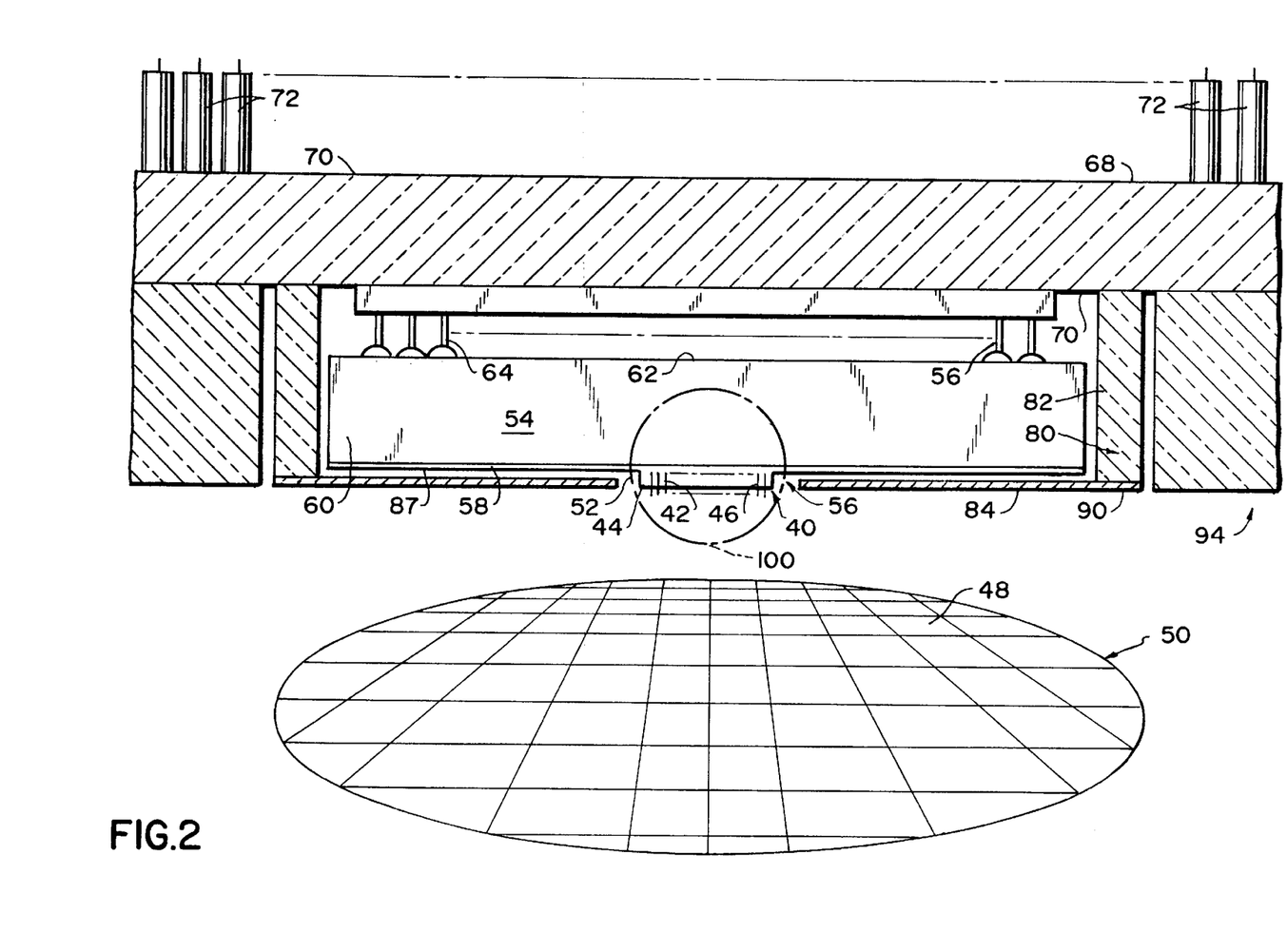
FIG. 2 shows a schematic diagram of a use of the probe structure according to the present invention incorporated onto a probe assembly.
Figure 3:
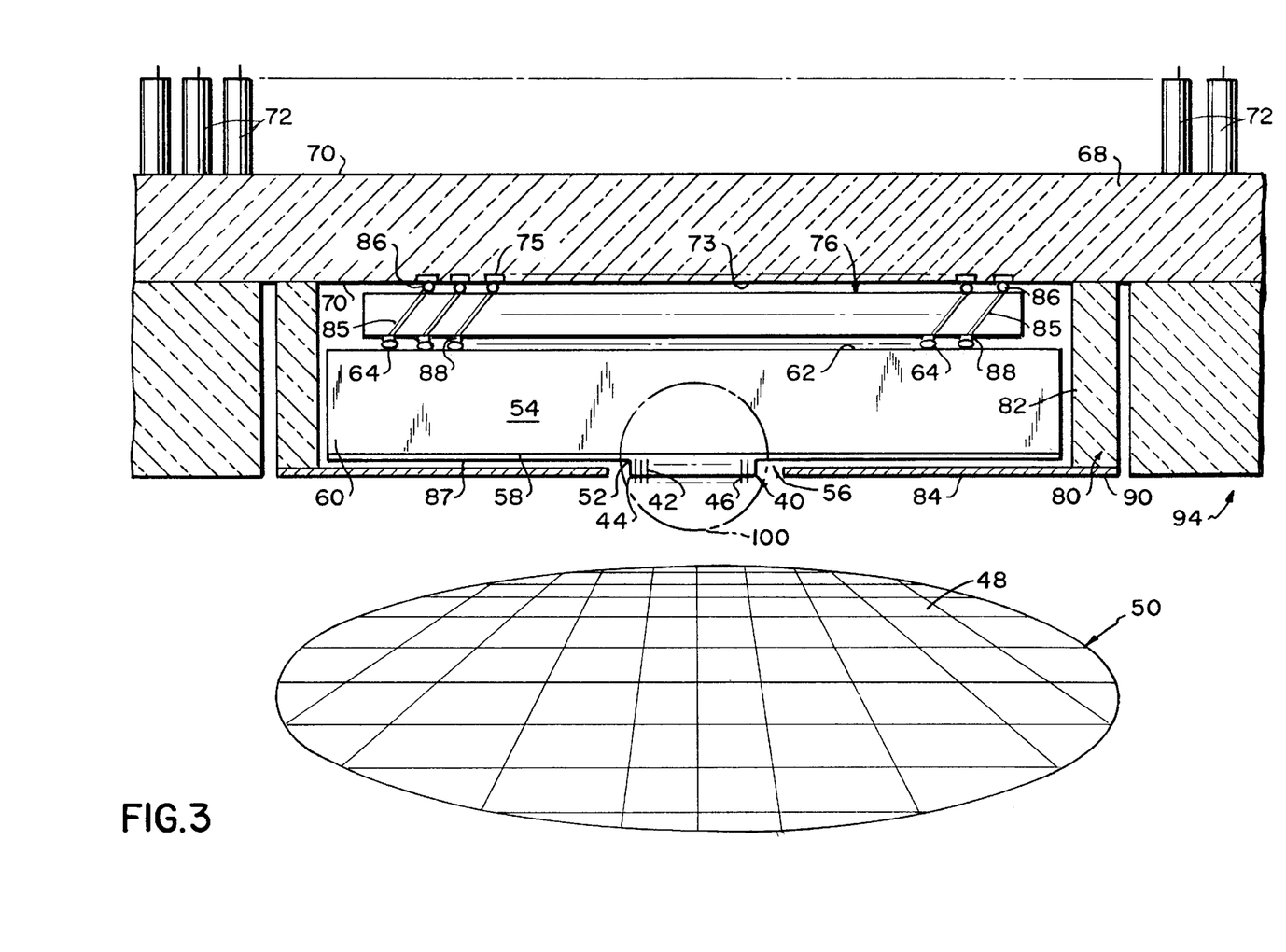
FIG. 3 shows a schematic diagram of another assembly using the probe structure of the present invention.

Turning now to the figures, FIGS. 2 and 3 show two embodiments of the test assembly according to the present invention. Numerals common between FIGS. 2 and 3 represent the same thing. Probe head 40 is formed from a plurality of elongated electrically conducting members 42 embedded in a material 44 which is preferably an elastomeric material 44. The elongated conducting members 42 have ends 46 for probing contact locations on integrated circuit devices 48 of wafer 50. In the preferred embodiment, the workpiece is an integrated circuit such as a semiconductor chip or a semiconductor wafer having a plurality of chips. The workpiece can be any other electronic device. The opposite ends 52 of elongated electrical conductors 42 are in electrical contact with space transformer (or fan-out substrate) 54. In the preferred embodiment, space transformer 54 is a multilevel metal/ceramic substrate, a multilevel metal/polymer substrate or a printed circuit board which are typically used as packaging substrates for integrated circuit chips. Space transformer 54 has, in the preferred embodiment, a surface layer 56 comprising a plurality of thin dielectric films, preferably polymer films such as polyimide, and a plurality of layers of electrical conductors, for example, copper conductors. A process for fabricating multilayer structure 56 by disposing it on surface 58 of substrate 60 to form a space transformer 54 is described in U.S. Pat. No. 5,258,236, entitled "MULTI-LAYER THIN FILM STRUCTURE AND PARALLEL PROCESSING METHOD FOR FABRICATING SAME", which is assigned to the assignee of the present invention, the teaching of which is incorporated herein by reference. Details of the fabrication of probe head 40 and of the assembly of probe head 40 and 54 will be described herein below.

As shown in FIG. 2, on surface 62 of substrate 60, there are a plurality of pins 64. Surface 62 is opposite the surface 56 on which probe head 40 is disposed. Pins 64 are standard pins used on integrated circuit chip packaging substrates. Pins 64 are inserted into socket 66. or plated through-holes in the substrate 68 which is disposed on surface 70 of second space transformer 68. Socket 66 is a type of pin grid array (PGA) socket such as commonly disposed on a printed circuit board of an electronic computer for receiving pins from a packaging substrate. Second space transformer 68 can be any second level integrated circuit packaging substrate, for example, a standard printed circuit board. Socket 66 is disposed on surface 70 of substrate 68. On opposite surface 70 of substrate 68 there are disposed a plurality of electrical connectors to which coaxial cables 72 are electrically connected. Alternatively, socket 66 can be a zero insertion force (ZIF) connector or the socket 66 can be replaced by through-holes in the substrate 68 wherein the through-holes have electrically conductive material surrounding the sidewalls such as a plated through-hole.

In the embodiment of FIG. 3, the pin 64 and socket 66 combination of the embodiment of FIG. 2 is replaced by an interposer, such as elastomeric connector 76. The structure of elastomeric connector 76 and the process for fabricating elastomeric connector 76 is described in U.S. Pat. No. 5,371,654 to B. Beaman et al., entitled "THREE DIMENSIONAL HIGH PERFORMANCE INTERCONNECTION MEANS", which is assigned to the assignee of the present invention, the teaching of which is incorporated herein by reference. The elastomeric connector can be opted to have one end permanently bonded to the substrate, thus forming a: FRU (field replacement unit) together with the probe/substrate/connector assembly.

Probe structure 100 of FIGS. 2 and 3 can be fabricated according to the method of U.S. Pat. No. 5,635,846, the teaching of which is incorporated herein by reference.

Figure 6:
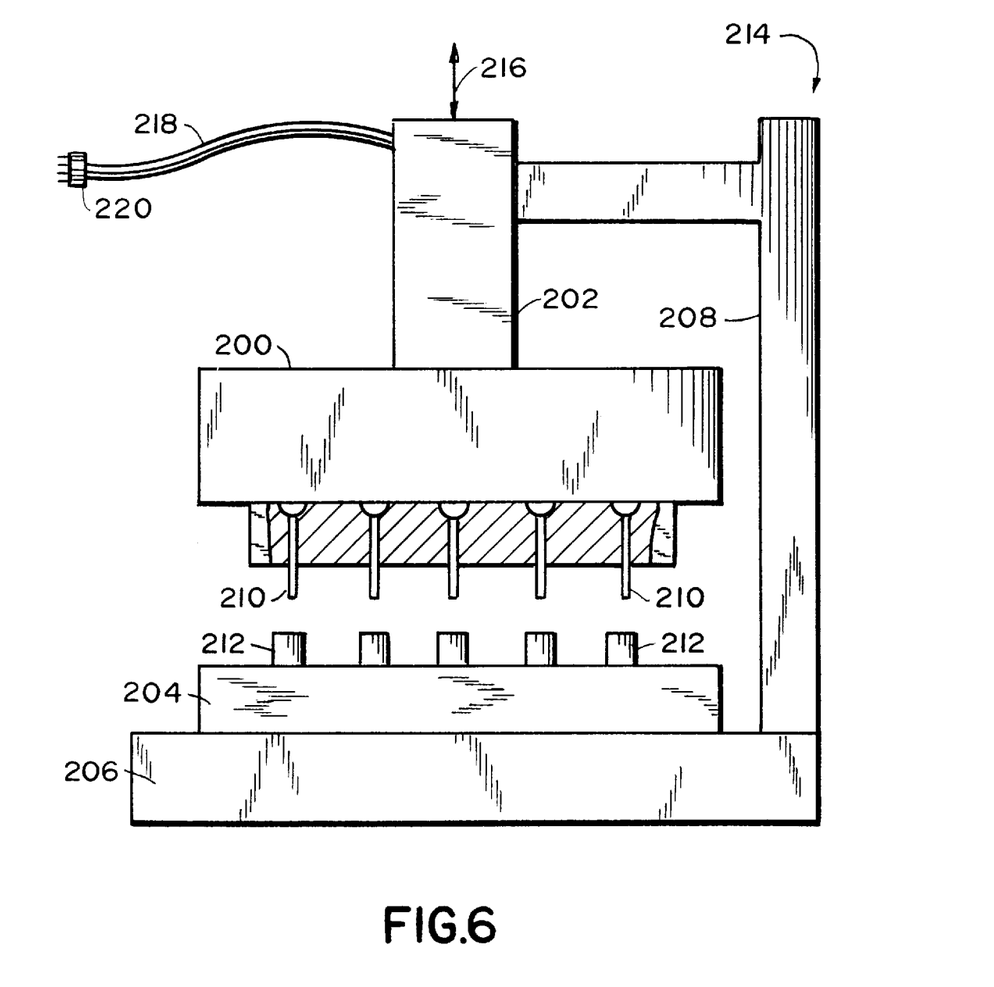
FIG. 6 schematically shows the assemblies of FIG. 2 and 3 in an apparatus for moving the probes into engagement with an IC device.

FIG. 6 schematically shows an apparatus for moving the assemblies 200 of FIGS. 2 and 3 into engagement with electronic device 204 so that the probe tips 210 engage the chip pads 212. The chip 204 is supported by base 206 of test apparatus 214 which has upright support 208 for attachment to means 202 for holding assembly 200 and has means for moving assembly 200 up and down as indicated by double arrow 216 into engagement and disengagement with device 204. Apparatus 214 has electrical cable 218 attached thereto for providing voltages and currents through plug 220 to device 204.

Figure 4:
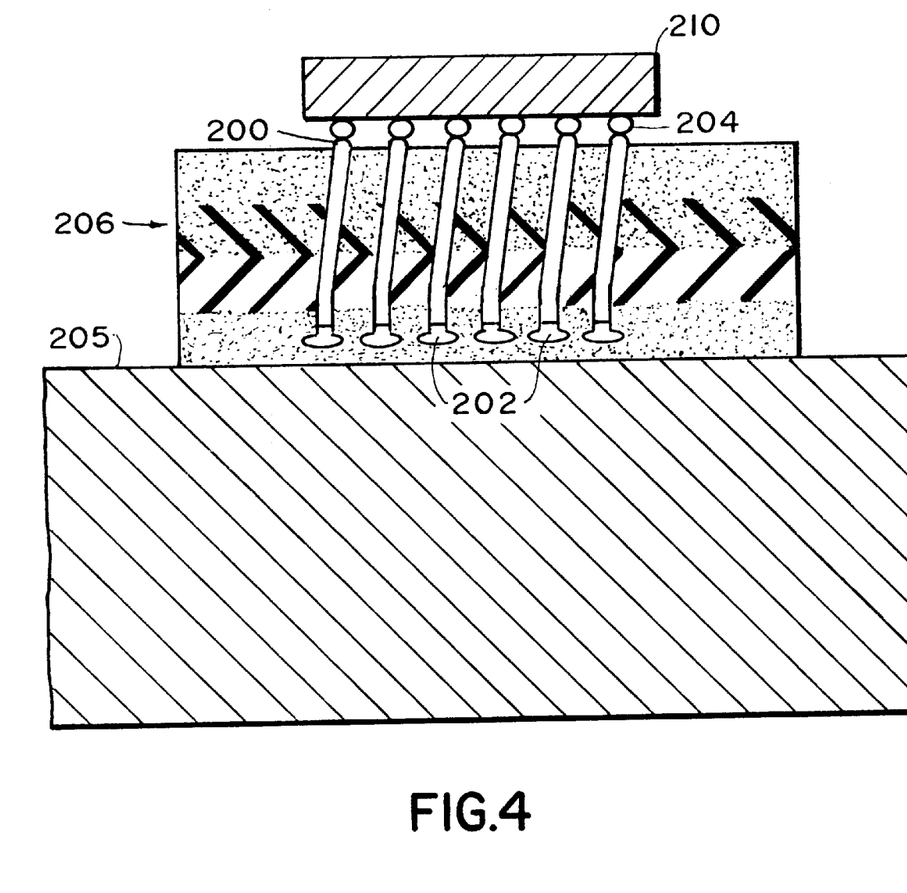
FIG. 4 shows the structure of an interposer connector comprising the elastomer foam.
Figure 5:
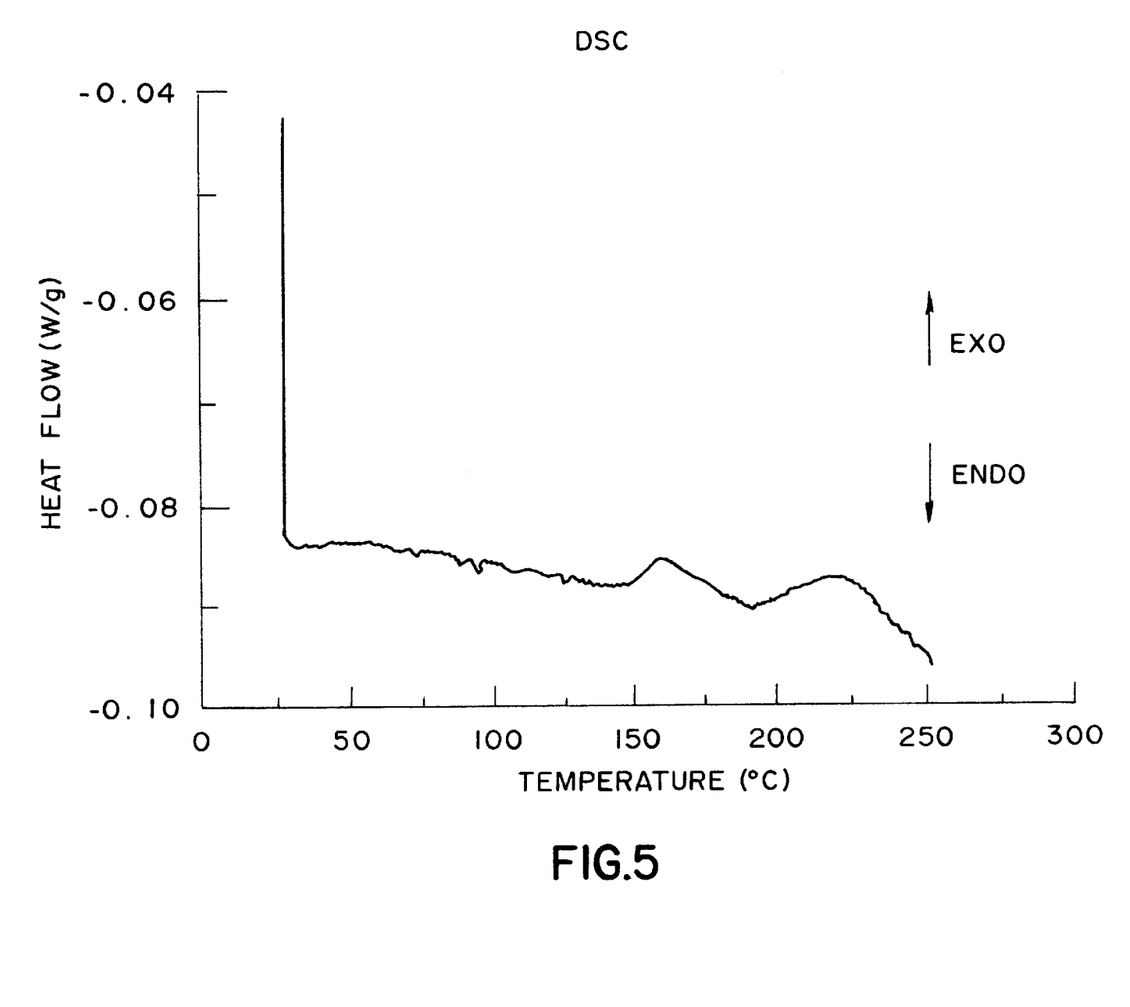
FIG. 5 is the DSC thermogram of crosslinked VTS1000.

The crosslinked polysiloxane foam can be molded in a variety of structures. FIG. 2 shows a simplified cross-section view of a high density testing probe for wafer level burn-in, as an example of using the polysiloxane foam. The high density conducting wires were embedded in the polysiloxane foam. A 10 mil displacement of wire conductor in vertical direction was found to be an optimal displacement to reach the fully contact between probe and wafer. The compressive force to engage the probe and wafer can be reduced tremendously when the polysiloxane foam supporting the conducting wires has a good compliance. FIG. 4 shows a cross-section view of an interposer connector as another example for using the elastomeric foam according to the present invention.

The interconnection wires 200 with a pad shape 202 on the bottom and a ball shape 204 on the top are embedded in an elastomeric foam 206 according to the present invention. The compressibility of this interconnector is totally dependent on the compliance of polysiloxane foam. Nevertheless, to meet the demanded toughness properties a multilayer structure of popsiloxane foam was designed as shown in FIGS. 1a and 3, comprising a filler rich top layer, a microsphere rich intermediate layer, and a filler rich bottom layer. The elastomeric foam 206 is disposed between substrate 208 and electronic device 210, such as an IC chip to provide electrical interconnection between the device and substrate.

The polysiloxane resin composition is mixed before pouring or injecting into a mold containing a substrate with fine wires projecting therefrom as described in U.S. Pat. No. 5,635,486 incorporated herein by reference above. The crosslinking process was done at room temperature, and can be done at elevated temperature. A degas process was applied to prevent the air voids formed in the polysiloxane foam. The preferable viscosities for elastomeric foam composition to level in the wire array are less than 5500 centipoise. The further addition of processing aid agents such as adhesion promoters or surfactants can lower the surface tension of elastomer.

It should be understood that the processing method of the present invention is not limited to an open mold. The structure of polysiloxan foam in the present invention can be molded into a multilayer structure or preferably a single layer structure, and such products can be in a variety of other shapes, such as sheet, tube, cubes, etc. As such, the present invention is intended to include all applicable forms and uses of these foams now known or later developed.

The present invention has been proven to provide a new method to produce foams having improved mechanical and dielectric properties to meet the demands of applications. From experiment to date, it has been shown that foaming 40% volume fraction in polysiloxane can reduce compressive force, applying on 1 square inch of polysiloxane reaching 5% displacement at 60 mils of thickness, from 85 lbs to 24 lbs. Even more, the thermal expansion of polysiloxane foam was reduced from 450 ppm to below 270 ppm, dielectric constant reduced from 3.6 to less than about 2.5, and density lowered from 1.01 to below 0.75 g/cm$^3$, which can not be achieved by other techniques in an open mold processing. In another embodiment, the compressive force is applied on 1 square inch of the foamed elastomer present in the structure of the present invention to reach 10% displacement is reduced by 12 lbs by heating the structure at 150° C. for at least 2 hours.

As to other properties of the structure, the dielectric constant of the elastomer material composition is reduced to less than about 2.5 when the elastomeric material composition contains greater than about 40% volume of empty space from said hollow particles.

Further the coefficient of thermal expansion of the elastomer having empty space based upon the presence of hollow particles is reduced to less than 270 parts per million by said elastomeric material composition containing less than 40% volume of empty space from said hollow particles.

The following example is a detailed description of methods of preparation and use of certain compositions in the present invention. The detailed preparations fall within the scope of, and serve to exemplify, the more generally described methods of preparation set forth above. The examples are presented for illustrative purposes only, and are not intended as a restriction on the scope of the invention.

EXAMPLE 1

100 parts of dimethyldiphenylsiloxane resin, VTS1000 (Silicon Resource), was compounded with 3.5 to 7 parts of silgard 182 curing agent (Dow Corning) per 100 parts of resin and a 10 ppm of platinum catalyst (Silicon Resource). The resin was charged in three separate runs with 0.5, 1, 1.5 parts of microspheres (DE551) per 100 parts of resin.

Crosslinking of polysiloxane foam was achieved in a 1×1×0.06 inch*3 mold and staying for 24 hours to effect the network formation. Fully crosslinked compositions can be reached by heating at 150° C. for 10 minutes.

The resulting properties of crosslinked polysiloxanes with different dosages of microspheres are shown in Table 1. The increase of microsphere loading enhanced the compliance from $6\times10^{-4}$/psi of polysiloxane to $1.3\times10^{-3}$/psi of 1.5 parts of microspheres loaded polysiloxane. The density of this 1.5 parts microsphere loaded polysiloxane has a ¾ of the density of polysiloxane and volume fraction of hollow foam is 27%.

The thermal expansion of crosslinked siloxane in the range of 50 to 100° C. measured by TMA (TA Instrument) is 450 ppm. It can be lowered down to 260 ppm by loading with 1.5 parts of DE551 microspheres.

EXAMPLE 2

The compositions and crosslinking process were followed the method described in example 1. The crosslinked polysiloxane foams were heated at 150° C. for 14 hours. The resulting compliances of heat treated polysiloxane foam are shown in Table 2. It is very interesting to point out that the compliances of crosslinked polysiloxane without foam inside are 8% decreased. This is due to the further crosslinking of polysiloxane occurring at 150° C., which can be seen from DSC measurement with two exothermic peaks near 150 and 200° C. of the thermogram in FIG. 4. Reversibly, the microsphere loaded polysiloxanes have a better compliance after the heat treatment, and an average 100% increase of compliance was found after the heat treatment at 150° C. for 24 hrs. The compliance enhancement is originated from the burst of microspheres which has been described above.

EXAMPLE 3

100 parts of polydimethyldiphenyl siloxane resin, PDV1625 (Gelest Inc.), was mixed with 8, 18, 28 parts of zinc oxide, and 2 parts of cerium oxide, and 0.5 part of microspheres. 5 parts of methyltrimethoxysilane was added as an "in situ" filler treatment. The mixture was heated to 80° C. while stirring and staying for 3 hours. The methanol, a side product of the filler treatment was removed during heating process.

The crosslinking process of PDV1625 compositions was achieved by the method described in example 1, except the additional ZnO/CeO loadings. The resulting compliances are shown in Table 3. Again, the compliance of crosslinked polysiloxane was enhanced by loading with DE091 microspheres, through the additional ZnO/CeO which reinforced the matrix as our prediction will lower the compliance and toughen the foam.

EXAMPLE 4

100 parts of PDV1625 was mixed with 0.5 part of DE091, silgard 182 curing agent, and a platinum catalyst as described in example 1. The siloxane resin composition was degased in a vacuum oven, then was injected into an open mold comprising a conducting wire array described in FIG. 2 or 3. The crosslinking process was followed the method described in example 1, and the resulting compliance of wire contained matrix is 0.0046(1/psi) at 10% displacement.

TABLE 1

The properties of VTS1000 loaded with varied amounts of DE551 microspheres.

| Loading of DE551 (parts) | 0 | 0.5 | 1 | 1.5 |
|---|---|---|---|---|
| Compliance (1/psi) | $6.0 \times 10^{-4}$ | $1.0 \times 10^{-3}$ | $1.1 \times 10^{-3}$ | $1.3 \times 10^{-3}$ |
| Volume Fractions of Microspheres | 0% | 11% | 20% | 27% |
| Density (g/cm$^3$) | 1.01 | 0.91 | 0.82 | 0.75 |

TABLE 2

The compliances of as-is and heat treated VTS1000 with varied loadings of DE551 microspheres.

| Loading of DE551 (parts) | 0 | 0.5 | 1 | 1.5 |
|---|---|---|---|---|
| Compliance (1/psi) | $6.0 \times 10^{-4}$ | $1.0 \times 10^{-3}$ | $1.1 \times 10^{-3}$ | $1.3 \times 10^{-3}$ |

TABLE 2-continued

The compliances of as-is and heat treated VTS1000 with varied loadings of DE551 microspheres.

| Loading of DE551 (parts) | 0 | 0.5 | 1 | 1.5 |
|---|---|---|---|---|
| 150° C., 14 hours Compliance (1/psi) | $5.5 \times 10^{-4}$ | $1.8 \times 10^{-3}$ | $2.2 \times 10^{-3}$ | $2.8 \times 10^{-3}$ |

TABLE 3

The compliances of as-is and heat treated PDV1625 with varied loadings of DE091 microspheres and ZnO/CeO.

| Loading of DE551 (parts) | 0 | 0.5 | 0.5 | 0.5 |
|---|---|---|---|---|
| Loading of ZnO/CeO (parts) | 0/0 | 8/2 | 13/2 | 18/2 |
| Compliance (1/psi) | $1.0 \times 10^{-3}$ | $2.5 \times 10^{-3}$ | $1.3 \times 10^{-3}$ | $1.3 \times 10^{-3}$ |
| 150° C., 14 hours Compliance (1/psi) | $8.9 \times 10^{-4}$ | $5.6 \times 10^{-3}$ | $1.7 \times 10^{-3}$ | $1.7 \times 10^{-3}$ |

While the present invention has been described with respect to preferred embodiments, numerous modifications, changes, and improvements will occur to those skilled in the art without departing from the spirit and scope of the invention.

The following is an exemplary list of silane coupling agents:
trichlorovinylsilane
triethoxyvinylsilane
glycidoxypropyltrimethoxysilane
aminopropyltriethoxysilane
trichloromethylsilane
trimethoxyphenylsilane and
mercaptopropyltrimethoxysilane

We claim:
1. An elastomeric foam structure comprising:
an array of elongated electrical connectors embedded in an elastomeric material composition, said elastomeric material composition comprising an elastomer matrix in admixture with hollow filler particles;
said elastomeric material composition is selected from the group consisting of a polysiloxane random copolymer comprising between about 70% to 85% weight percent of dimethylsiloxane and about 15% to 30% diphenylsiloxane natural rubber, styrene-butadiene rubber, polybutadiene rubber, isobutylene-isoprene rubber, ethylene-propylene rubber, nitrile-butadiene rubber, polychloroprene neoprene, chlorosulfonated polyethylene, chlorinated polyethylene, epichlorhydrin elastomer, acrylic elastomers, polysulfide elastomers, silicone elastomers, fluorocarbon elastomers, thermoplastic styrenic polymers, urethane polymers, olefin elastomers, and combinations thereof;
said hollow filler particles each comprising a compressible polymeric shell formed from homo- or copolymers selected from the group consisting of styrene-acrylonitrile, poly(methyl methacrylate), poly(vinylidene chloride), poly(vinyl alcohol), polyaniline, polyimides, polyamides, polycarbonate, polyethylene and silicon rubber;
each said hollow filler particle encapsulating a gas, said hollow filler particle being formed from a solid filler containing a blowing agent, wherein said solid fillers are selected from the group consisting of zinc oxide and ceric dioxide, neodymium oxide, samarium oxide and europium oxide, said blowing agent formed from a material which decomposes upon application of heat or radiation energy;

said elastomeric material composition having been crosslinked by agents selected from the group consisting of methylhydrosiloxane-dimethylsiloxane copolymers, oxygen, peroxides, poly 1,4-polydienes and sulfur;

so that when said elastomeric material composition is subjected to a compressive force, said elastomer material composition returns to its original shape after said compressive force is released, wherein said elastomer material composition has a lower density and coefficient of thermal expansion than said elastomer matrix.

2. The structure according to claim 1, wherein said elastomeric material composition is a sandwich structure comprising 8 to 40% by weight of zinc oxide loaded polysiloxane on a bottom layer, 10 to 60% by volume fraction of foamed polysiloxane on an intermediate layer, and 8 to 40% by weight of zinc oxide loaded polysiloxane on a top layer.

3. The structure according to claim 1, wherein said solid filler comprises zinc oxide in the range from about 5% to 30% by weight.

4. The structure according to claim 3, wherein said reinforced fillers comprise ceric dioxide, neodymium oxide, samarium or europium oxide, in the range from about 2% to about 10% by weight.

5. A structure comprising:

an elastomeric material;

a plurality of elongated electrical conductors extending through said elastomeric material;

hollow particles within said elastomeric material, said hollow particles being compressible and wherein each of said hollow particles has a shell and a portion of said particles has a perforation in said shell.

6. A structure comprising:

an elastomeric material;

a plurality of elongated electrical conductors extending through said elastomeric material;

hollow particles within said elastomeric material, said hollow particles being compressible and wherein said elastomeric material has a plurality of layers, at least one of said plurality of layers contains said hollow particles, and at least one of said plurality of layers contains reinforcing filler particles.

7. An elastomeric foam structure comprising:

an array of elongated electrical connectors embedded in an elastomeric material composition, said elastomeric material composition comprising an elastomer matrix in admixture with hollow filler particles;

said elastomeric material composition is selected from the group consisting of a polysiloxane random copolymer comprising between about 70% and 85% by weight percent of dimethylsiloxane and about 15% to 30% diphenylsiloxane, natural rubber, styrene-butadiene rubber, polybutadiene rubber, isobutylene-isoprene rubber, ethylene-propylene rubber, nitrile-butadiene rubber, polychloroprene neoprene, chlorosulfonated polyethylene, chlorinated polyethylene, epichlorhydrin elastomer, acrylic elastomers, polysulfide elastomers, silicone elastomers, fluorocarbon elastomers, thermoplastic styrenic polymers, urethane polymers, olefin elastomers, and combinations thereof;

said hollow filler particles each comprising a compressible polymeric shell formed from homo- or copolymers selected from the group consisting of styrene-acrylonitrile, poly(methyl methacrylate), poly(vinyl chloride), poly(vinyl alcohol), polyaniline, polyimides, polyamides, polycarbonate, polyethylene and silicon rubber;

each said hollow filler particle encapsulating a gas, said hollow filler particle being formed from a solid filler containing a blowing agent which decomposes upon application of heat or radiation energy;

each said hollow filler particle encapsulating a gas, said hollow filler particle being formed from a solid filler containing a blowing agent, said blowing agent formed from a material which decomposes upon application of heat or radiation energy;

said elastomeric material composition containing reinforced fillers selected from the group consisting of zinc oxide, ceric dioxide, neodymium oxide, samarium oxide and europium oxide;

said elastomeric material composition having been crosslinked by agents selected from the group consisting of methylhydrosiloxane-dimethylsiloxane copolymers, oxygen, peroxides, poly 1,4-polydienes and sulfur;

so that when said elastomeric material composition is subjected to a compressive force, said elastomeric material composition returns to its original shape after said compressive force is released, wherein said elastomeric material composition has a lower density and coefficient of thermal expansion than said elastomer matrix.

* * * * *